(12) United States Patent
Lane

(10) Patent No.: US 11,087,194 B2
(45) Date of Patent: Aug. 10, 2021

(54) BIO-POLYMER MULTI-FACTOR AUTHENTICATION AND IDENTIFICATION SYSTEM AND RELATED METHODS

(71) Applicant: The United States of America, as represented by the Secretary of the Navy, Crane, IN (US)

(72) Inventor: Donald J. Lane, Crane, IN (US)

(73) Assignee: The United States of America, as represented by the Secretary of the Navy, Washington, DC (US)

(*) Notice: Subject to any disclaimer, the term of this patent is extended or adjusted under 35 U.S.C. 154(b) by 0 days.

(21) Appl. No.: 17/092,755

(22) Filed: Nov. 9, 2020

(65) Prior Publication Data

US 2021/0142140 A1    May 13, 2021

Related U.S. Application Data

(60) Provisional application No. 62/932,065, filed on Nov. 7, 2019.

(51) Int. Cl.
*G06K 19/073* (2006.01)
*G06K 19/06* (2006.01)
*H04L 9/32* (2006.01)

(52) U.S. Cl.
CPC . *G06K 19/07309* (2013.01); *G06K 19/06028* (2013.01); *H04L 9/3263* (2013.01)

(58) Field of Classification Search
CPC ........ G06K 19/00; G06K 19/04; G06K 19/06; G06K 19/067; G06K 19/07
USPC ................................ 235/492, 487, 380, 375
See application file for complete search history.

(56) References Cited

U.S. PATENT DOCUMENTS

| | | | |
|---|---|---|---|
| 6,910,634 B1* | 6/2005 | Inose | G06K 7/0008 235/486 |
| 7,044,368 B1* | 5/2006 | Barron | G06K 19/07 235/380 |
| 7,360,688 B1* | 4/2008 | Harris | G06K 7/0021 235/380 |
| 2019/0286805 A1* | 9/2019 | Law | G06F 21/34 |
| 2020/0257408 A1* | 8/2020 | Yoshida | G06F 3/0443 |

* cited by examiner

*Primary Examiner* — Edwyn Labaze
(74) *Attorney, Agent, or Firm* — Naval Surface Warfare Center, Crane Division; Eric VanWiltenburg

(57) ABSTRACT

The invention relates to a smart card that includes an integrated keypad made with a piezoelectric material. A user can press the keypad to generate an electrical signal. A sequence of signals corresponding to a user's personal identification number can be sent to an integrated circuit chip or otherwise compared against a stored PIN to determine if the user has entered the correct PIN.

5 Claims, 3 Drawing Sheets

BIO-POLYMER MULTI-FACTOR AUTHENTICATION AND IDENTIFICATION SYSTEM AND RELATED METHODS

CROSS REFERENCE TO RELATED APPLICATIONS

This application claims priority to U.S. Provisional Application Ser. No. 62/932,065, titled "BIO-POLYMER MULTI-FACTOR AUTHENTICATION AND IDENTIFICATION SYSTEM AND RELATED METHODS" filed on Nov. 7, 2019, the disclosure of which is expressly incorporated herein by reference.

STATEMENT REGARDING FEDERALLY SPONSORED RESEARCH OR DEVELOPMENT

The invention described herein was made in the performance of official duties by employees of the Department of the Navy and may be manufactured, used and licensed by or for the United States Government for any governmental purpose without payment of any royalties thereon. This invention (Navy Case 200,628) is assigned to the United States Government and is available for licensing for commercial purposes. Licensing and technical inquiries may be directed to the Technology Transfer Office, Naval Surface Warfare Center Crane, email: Cran_CTO@navy.mil.

FIELD OF THE INVENTION

The present invention relates to an identification system utilizing bio-polymer circuitry to enable multi-factor authentication for secure access.

BACKGROUND AND SUMMARY OF THE INVENTION

The present invention relates to an identification system utilizing bio-polymer circuitry to enable multi-factor authentication for secure access. Current security cards commonly use an integrated circuit chip (ICC) to store information (e.g., security certificates, personal identification number (PIN)) on the card. To access secure systems or areas, a user will insert the card into a card reader and use an external keypad to type a PIN, which is transmitted to the ICC and checked against a stored information. However, the use of external keypad's can compromise a user's PIN or other information by enabling a third party to intercept, copy, or replicate the PIN.

According to an illustrative embodiment of the present disclosure, an access card can include an integrated keypad made with a piezoelectric material. A user can press the keys to generate an electrical signal. A sequence of signals corresponding to a user's PIN can be sent to an ICC or otherwise compared against a stored PIN to determine if the user has entered the correct PIN.

According to a further illustrative embodiment of the present disclosure, circuitry of the access card can be made with a degradable polymer material such that the circuit breaks down over time to ensure the lifetime of the card doesn't exceed a desired period of time. Degradation can be triggered by electrically pulses created by an incorrect PIN entry such that the access card is protected from access by unauthorized users.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which.

DETAILED DESCRIPTION OF THE DRAWINGS

The embodiments of the invention described herein are not intended to be exhaustive or to limit the invention to precise forms disclosed. Rather, the embodiments selected for description have been chosen to enable one skilled in the art to practice the invention.

Figure 1:
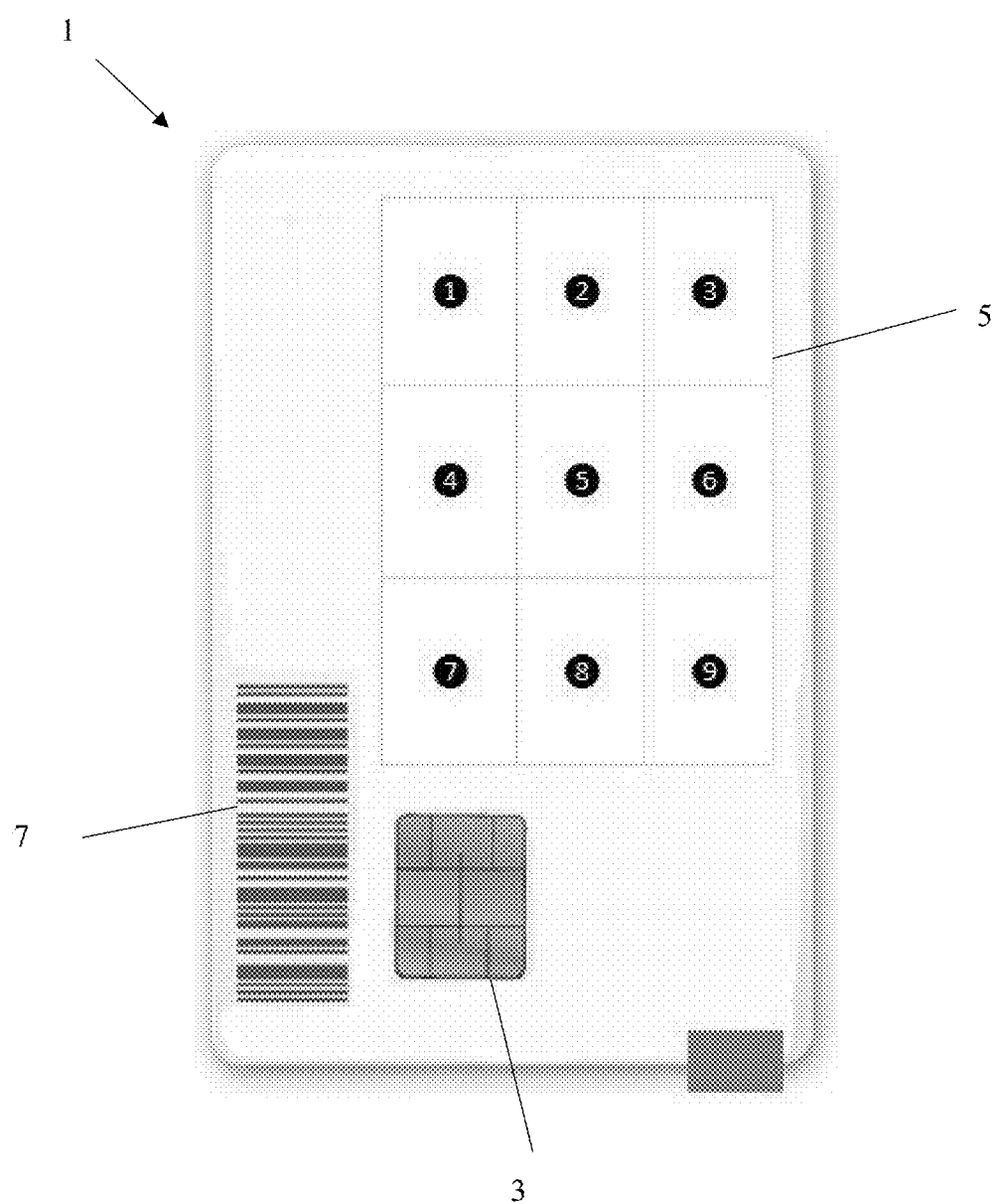
FIG. 1 shows an exemplary access card.

FIG. 1 shows an exemplary access card 1 with ICC 3, keypad section 5, and bar code section 7. The access card 1 offers multi-factor authentication through non-repudiation including behavioral biometric recognition. The mechanical method of authentication is based on the stress of operation which combines elastic and viscous stress methods that can be imposed on polymer nano-circuitry materials in keypad section 5 through the application of net forces, for example, by utilizing chemical composition and external electromagnetics fields (as in piezoelectric and magnetostrictive materials). Through this methodology it will allow the user to authenticate for access and interface with information systems, or entry into secure spaces without impacting operational capability or incur downtime that it would normally take to log into an information system or secure spaces. The access card 1 can use polymer compounds that offer piezo electrical impulses which are embedded as a circuitry pattern overlaid by a 0-9 number pad in the keypad section 5. This can allow a user to enter a sequence of numbers on the number pad or swipe areas through haptic touch on the smart card akin to how a conventional PIN entry is done with a keyboard. Once the user exerts pressure on a specific region of the polymer circuit the piezo electrical pulse which will travel through the circuitry architecture to an assigned number or area, the pulse can then be translated into an object binary code which can be authenticated against a central repository or embedded certificate data base in access card 1 or ICC 3.

The piezo electrical impulses can also follow along the circuitry to a demarcation point in the bar code section 7 where an organic polymer chamber with correlating flexible fibers can expand and are viewable as a barcode on the face plate of the access card allowing an RF ID reader to identify the bar readout and can be authenticated against a central repository or certificate database. The ICC 3 where certificates are stored can also store a second pin in object data storage code for authentication purposes, which, if the user enters correctly or incorrectly, can cause a return feed of piezo electrical impulses along the internal polymer circuitry which will degrade compositionally over time by itself. The piezo electrical feed impulses can also be harnessed internally at the circuitry layer that would allow a wipe of any resident memory from the ICC 3, similar to current degauss methods used on credit cards and hard drives.

Figure 2:
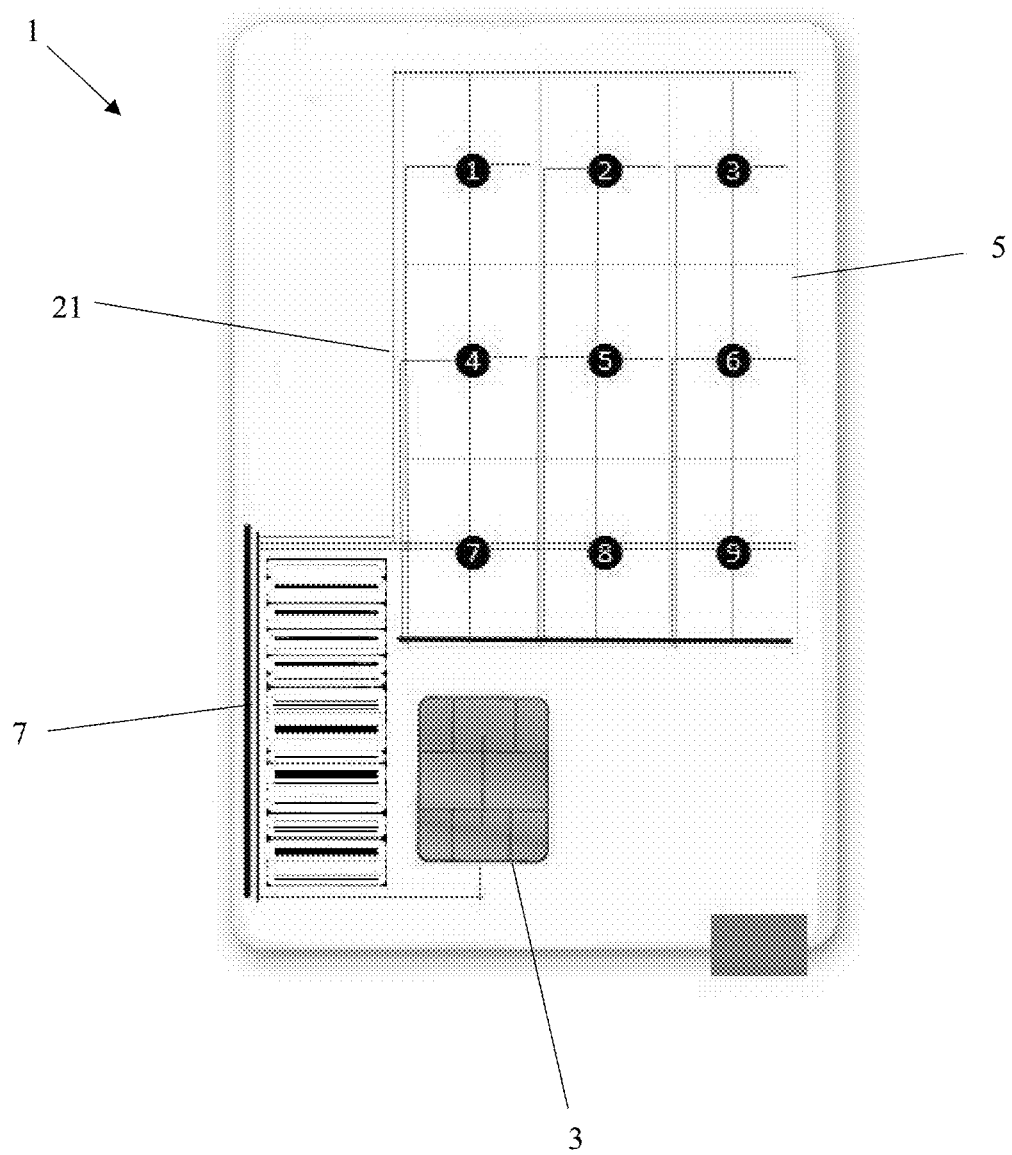
FIG. 2 shows an exemplary access card with electrical coupling between components.

FIG. 2 shows an exemplary access card 1 with electrical coupling 21 between components. Keypad section 5 can be coupled to ICC 3 so that an entered PIN will be transferred to ICC 3 and any devices coupled to ICC 3. Keypad section 5 can be coupled to bar code section 7 so that an entered PIN will generate a bar code which can be scanned.

Figure 3:
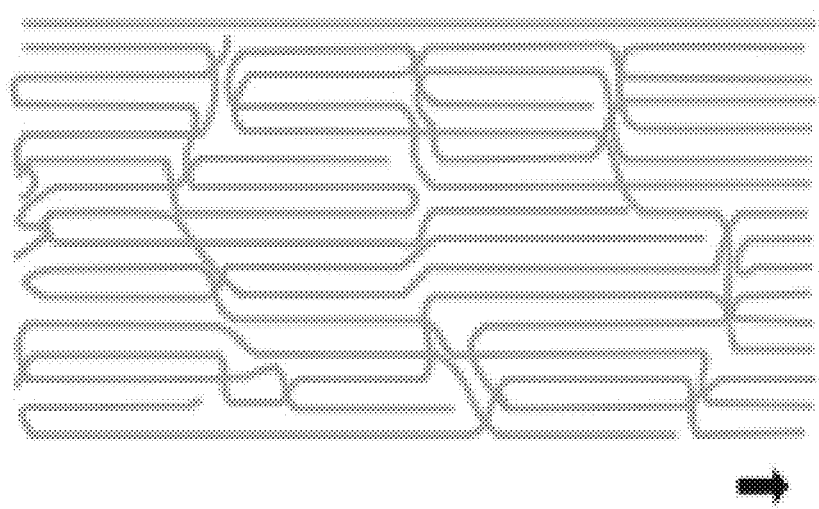
FIG. 3 shows an exemplary polymer strand circuit.

FIG. 3 shows an exemplary polymer strand circuit.

Although the invention has been described in detail with reference to certain preferred embodiments, variations and modifications exist within the spirit and scope of the invention as described and defined in the following claims.

The invention claimed is:

1. An access card comprising:
   a keypad section comprising at least nine key sections comprising a piezoelectric material and a barcode section electrically coupled to the keypad section;
   an integrated circuit chip (ICC) electrically coupled to the keypad section by circuitry, wherein a personal identification number (PIN) is stored in the ICC;
   wherein applying force to the at least nine key sections generates an electrical current, wherein the ICC transforms the electrical current into a sequence of characters, wherein the ICC is configured to compare the sequence of characters to the PIN.

2. The access card of claim 1, further comprising a barcode section electrically coupled to the keypad section.

3. The access card of claim 1, further comprising a plurality of fibers, wherein the plurality of fibers form a bar code in response to the electrical current.

4. The access card of claim 1, wherein the ICC is configured to generate a reaction current if the sequence of characters does not match the PIN, wherein the reaction current damages the circuitry.

5. The access card of claim 4, wherein the reaction current resets non-volatile memory within the ICC.

* * * * *